United States Patent [19]

Haramaki et al.

[11] Patent Number: 4,691,856

[45] Date of Patent: Sep. 8, 1987

[54] DIFFUSION BONDING METHOD USING A HIGH ENERGY BEAM

[75] Inventors: Takashi Haramaki, Tohkai; Takao Funamoto, Hitachi; Satoshi Kokura, Hitachiohta; Masahisa Inagaki, Hitachi; Ryutaro Jimbou, Hitachiohta; Toshimi Sasaki, Mito; Kousei Nagayama, Tohkai, all of Japan

[73] Assignee: Hitachi, Ltd., Tokyo, Japan

[21] Appl. No.: 749,764

[22] Filed: Jun. 28, 1985

Related U.S. Application Data

[63] Continuation of Ser. No. 397,048, Jul. 12, 1982, abandoned.

[30] Foreign Application Priority Data

Jul. 13, 1981 [JP] Japan .................................. 56-109872

[51] Int. Cl.[4] .............................................. B23K 19/00
[52] U.S. Cl. .................................................... 228/194
[58] Field of Search ............... 228/193, 194, 195, 198, 228/263.13, 219; 148/6 B, 6; 427/383–389; 204/192 R

[56] References Cited

U.S. PATENT DOCUMENTS

| 3,339,269 | 9/1967 | Hanink ................................. 228/219 |
| 3,632,319 | 1/1972 | Hoppin ............................. 228/263.13 |
| 3,753,794 | 8/1973 | Paulonis et al. ..................... 148/6 B |
| 3,908,183 | 9/1975 | Ennis ...................................... 29/584 |
| 4,208,222 | 6/1980 | Barlow et al. ....................... 228/194 |
| 4,285,459 | 8/1981 | Baladjanian et al. ............... 228/194 |
| 4,446,474 | 5/1984 | Mizusaki et al. .................... 204/1 T |

FOREIGN PATENT DOCUMENTS 2147755 3/1973 Fed. Rep. of Germany ...... 148/6 B

Primary Examiner—M. Jordan
Attorney, Agent, or Firm—Antonelli, Terry & Wands

[57] ABSTRACT

Disclosed is a diffusion bonding method which can be applied to superalloys and comprises forming in advance an alloy layer containing an additional element or elements having a higher diffusion speed than that of the principal constituent element of a base metal and a lower melting point than that of the base metal on the joint surface of the base metal consisting of a heat-resistant superalloy based on Co, Ni, Fe, Ti or the like, and bringing the joint surfaces into contact so as to diffuse B.

7 Claims, 4 Drawing Figures

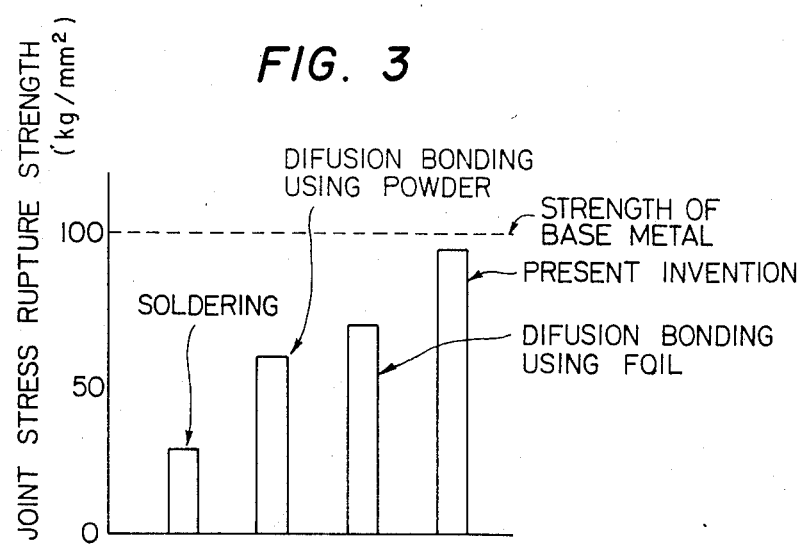

DIFFUSION BONDING METHOD USING A HIGH ENERGY BEAM

This is a continuation of application Ser. No. 397,048, filed July 12, 1982, now abandoned June 28, 1985.

BACKGROUND OF THE INVENTION

This invention relates to a diffusion bonding method to be adapted to a superalloy based on Ni, Co, Fe or Ti.

Recently, gas turbine blades have been produced by joining structural members consisting of superalloys together in a predetermined configuration. In bonding the superalloys, however, they must have the same properties as those of the superalloy base metals and hence, no definite bonding method has yet been established. Fusion welding or high temperature brazing using a Ni-based brazing material has generally been employed. However, strict limitations exist in applying the fusion welding techniques to turbine structural members and a number of structural elements can not be adapted simply because of their complicated shapes.

Though brazing offers a number of advantages in comparison with fusion welding, it has very limited application because the brazed joint portion has relatively low strength and its melting point is low. Diffusion bonding, which involves the movement of the atoms between the contact base metals, is known as a bonding method having high reliability. To practise this method, however, severe requirements must be satisfied. That is, the surface coarseness of the joint surfaces must be minimized, the joint surfaces must be completely cleaned and a non-joint interface must be eliminated. To satisfy the last mentioned requirement, diffusion treatment must be carried out under high pressure contact conditions for an extended period of time.

To facilitate the finish of the joint surface and to improve the joint strength, there have been proposed a method which arranges a powder insert material between the base metal surfaces to be joined and carries out diffusion bonding until the insert material finishes the reaction with the base metals (U.S. Pat. No. 3,632,319) and a method which places a foil-like insert material between the base metals to be joined and carries out diffusion bonding until the insert material finishes the reaction with the base metals (U.S. Pat. No. 3,678,570).

When the foil is used as the insert material in accordance with the prior art methods, two interfaces exist between the base metals and the insert material and when the powder is used as the insert material, an extremely great number of interfaces exist between them. The greater the number of the interfaces between the joint surface of the base metals and the reactive metallic insert material, the severer becomes the pre-treating condition of the base metal surface and the longer becomes the time required for diffusion treatment. Incidentally, diffusion treatment is carried out for about 24 hours in order to obtain the joint portion having substantially the same characteristics as those of the base metals.

SUMMARY OF THE INVENTION

The present invention is primarily directed to provide a diffusion bonding method of superalloys which can obtain the joint portion having substantially the same characteristics as those of the base metal within a short period of time.

The abovementioned object of the present invention can be accomplished by forming in advance a low melting alloy layer containing those additional elements, which have a diffusion speed higher than the diffusion speed of the principal constituent elements of the base metal, on at least one of the joint surfaces of the base metal, then bringing the joint surfaces of the base metal into contact and thereafter effecting a diffusion treatment.

BRIEF DESCRIPTION OF THE DRAWINGS

FIG. 1 is a schematic view showing the diffusion state of the joint surface in the method of the present invention in comparison with that in the prior art method;

FIG. 3 is a diagram showing the high temperature tensile strength of the joint portion in accordance with the present invention in comparison with that in accordance with the prior art.

DESCRIPTION OF THE PREFERRED EMBODIMENTS

Figure 2A:
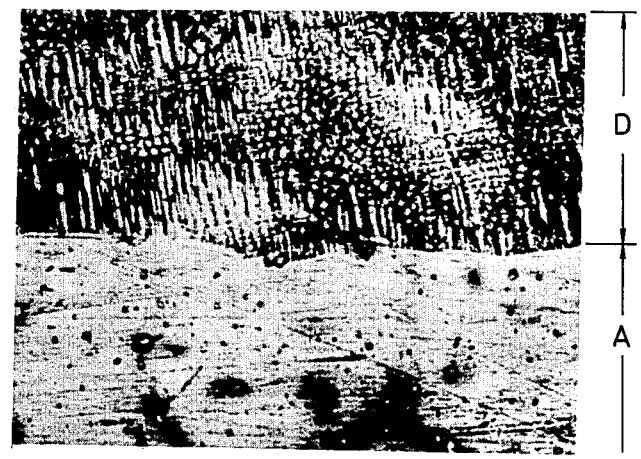
FIG. 2(A) is a micrograph showing the state of formation of the alloy layer in an embodiment of the present invention.

In the present invention, the base metal is preferably a superalloy based on Co, Ni, Fe, Ti and the like, having ultrahigh heat-resistance. The low melting alloy layer to be formed on the base metal is formed on one or both surfaces of the base metal to be joined. When the low melting alloy is formed on one of the joint surfaces of the base metal, the interface to be subjected to diffusion treatment is one interface between the low melting alloy layer and the joint surface of the base metal. When the low melting alloy layer is formed on both joint surfaces of the base metal, the interface at the time of diffusion treatment is between the low melting alloy layers.

It is an essential condition that the above-mentioned low melting alloy layer has a melting point lower than that of the base metal and a higher diffusion speed than that of the principal constituent elements of the base metal. In the case of the heat-resistant superalloy based on Co, Ni, Fe and Ti, B and Hf can be mentioned as the example of the additional element. Especially when B is used for the low melting alloy layer, B reacts with Ni as the principal constituent element and forms an eutectic point inside the matrix of the base metal if the base metal is a Ni-based heat-resistant super-alloy. The Ni-B eutectic point is 1,080° C. which is lower than the melting point of the base metal, i.e., 1,250° C. Hence, diffusion proceeds effectively at a temperature lower than the melting point of the base metal. It is also possible to add Si, P, Mn, Nb, Ta and the like besides B and Hf to the low melting alloy layer in order to lower the melting point and to effect surface cleaning of the alloy layer.

The low melting alloy layer can be formed on the joint surface or surfaces of the base metal by, for example, fusing the additional element(s) (element having a higher diffusion speed than that of the principal constitutent element of the base metal) in the form of powder or foil on the joint surface of the base metal. Laser or plasma radiation is most practical as the diffusion method from the aspect of workability. Besides the diffusion method of the additional element, the alloy layer can be formed on at least one of the joint surfaces of the base metal by ion injection CVD, spraying, and the like. Incidentally, when the additional element is used in the form of powder, a preferred method involves the steps of dispersing homogeneously the powder in an organic binder, coating the joint surface of the base metal with the dispersion and then fusing the dispersion. There is no limitation to the organic binder, in particular. For example, a solution prepared by dissolving an acrylic resin in an organic solvent such as ethyl acetate and/or methyl ethyl ketone can be used as the organic binder.

The thickness of the low melting alloy layer is associated with the tolerance of the surface finish of the base metal. The smaller the thickness, the greater the effect. Practically, however, the thickness is preferably up to 100 μm.

Diffusion treatment is carried out by opposing the joint surfaces of the base metals with each other after the low melting alloy layer is formed on each joint surface, and then heating the base metals in a non-oxidizing atmosphere. An electric oven at a reduced pressure of $10^{-3}$ Torr or below can be employed as the non-oxidizing atmosphere. The heating temperature is within the range from the melting point of the low melting alloy layer to the melting point of the base metal. If the heating temperature is below the melting point of the low melting alloy layer, diffusion becomes insufficient. If the heating temperature is higher than the melting point of the base metal, on the other hand, the base metal is likely to undergo deformation. To improve adhesion of the alloy layer, it is preferred that a load of up to 30 kg/mm$^2$, preferably 0.5 kg/mm$^2$, be added to the weight of the base metal during diffusion treatment. Since the interface at the time of joining the base metals is only one and the diffusion time is short in accordance with the present invention, the diffusion treatment can be sufficiently effected even at a low load.

During diffusion treatment, the alloy layer having a low melting point is first fused with the rise of the heating temperature and mutual diffusion proceeds between the low melting alloy layer and the base metal with the passage of time. When a certain period of time is reached, the alloy layer prior to joining no longer exists and a metal structure equivalent to the base metal takes place.

The time required for this diffusion treatment is shorter than that required in the conventional method using the insert material. The reason is assumed as follows.

A foil not containing Al and Ti as the separation promoter element is used as the conventional method. When a superalloy based on Ni is used as the base metal, for example, it can be assumed that homogeneous diffusion of Al, Ti and B into Ni would exert significant influences upon the joint strength. At the diffusion heating temperature of 1,170° C., the diffusion coefficients of Al and Ti are $3.74 \times 10^{-10}$ cm$^2$/S and $4.26 \times 10^{-10}$ cm$^2$/S, respectively, and are approximate to each other. The diffusion coefficient of B is $3.04 \times 10^{-6}$ cm$^2$/S at the diffusion heating temperature of 1,170° C.

The diffusion state of the joint portion in the case of the foil (conventional method) and in the case of the alloy layer (method of present invention) can be approximately expressed by the following formulas (1) and (2), respectively. Since the diffusion coefficients of Al and Ti are approximate to each other, the diffusion state for Al and B are illustrated.

$$C_p = \frac{C_o h_o}{2\sqrt{\pi Dt}} \quad \ldots (B) \quad (1)$$

$$C_p = C_o \left(1 - \frac{D_o h_o}{2\sqrt{\pi Dt}}\right) \quad \ldots (Al) \quad (2)$$

$C_o$: initial concentration
$h_o$: film thickness of insert material
$C_p$: temperature at the center of joint portion
$D$: diffusion coefficient
[with the proviso that $D = D_o \exp(-Q/RT)$]

Since the present invention does not use the insert material, $h_o \approx 0$ in the formula (2), whereas $h_0 =$ several μm in the conventional method because it uses the insert material (foil). Accordingly, diffusion of Al or Ti is not necessary in the present invention and the time required for joining is determined solely by the diffusion of B which has a high diffusion coefficient.

FIG. 1 schematically illustrates the result of calculation of the relation between the concentration distribution and the time by use of the formulas (1) and (2). Here, the gap between the joint base metals is 0.05 to 0.1 mm and the diffusion heating temperature is 1,170° C. It can be seen from FIG. 1 that the B concentration at the joint portion is high at the diffusion treatment time $t_o$ and a low square diffusion state with a low Al concentration is observed in the conventional method, whereas the concentration gradient of B can be observed in the method of the present invention. When the diffusion treatment time exceeds 10 minutes, B diffuses into the base metal in the conventional method because its diffusion speed is high while Al diffuses from the base metal into the intermediate layer. Since homogenization can be accomplished only by diffusion of B in the present invention, it is not necessary to take Al diffusion into consideration. After one hour further passes, diffusion proceeds in the conventional method but since diffusion of Al is not complete, the strength of the joint point is not fully compatible to that of the base metal. In accordance with the method of the present invention, on the other hand, diffusion of B has sufficiently proceeded after one hour and homogenization has been substantially accomplished. Incidentally, the diffusion treatment for at least 24 hours is necessary in the conventional method in order to obtain the joint strength compatible to that of the base metal. Thus, it can be appreciated from FIG. 1 that the present invention makes it possible to carry out the diffusion treatment within a much shorter period than the conventional method.

EXAMPLE

Figure 2B:
FIG. 2(B) is a micrograph showing the metal structure of the joint surface after diffusion treatment in the embodiment of the present invention.

An IN-738LC testpiece for tensile test, a heat-resistant superalloy, was used as the base metal, and its joint surface was coated with a dispersion prepared by mixing B powder, an acrylic resin and methyl ethyl ketone in a mixing ratio of 1:1:1. Laser beam was radiated on the surface within several seconds. (Laser radiation conditions were as follows: 2 kw CO$_2$ laser; output 1.8 kw; scanning speed 0.5 m/min). After this radiation, an alloy layer D consisting principally of Ni-B was formed on the base metal A in a thickness of about 50 μm, as shown in FIG. 2(A). The alloy layer surfaces of the tensile testpieces having the alloy layers formed thereon were opposed each other, were placed in an electric oven and were vacuum-sucked at a pressure of $5 \times 10^{-5}$ Torr. In this instance, a 0.05 kg/mm² load was applied to the testpiece in order to improve adhesion of the joint surfaces. The diffusion treating temperature was set to 1,170° C. and after this temperature was attained, the testpiece was held at that temperature for one hour and was thereafter cooled. FIG. 2(B) shows the metal structure in the proximity of the joint surfaces after the diffusion treatment. It can be seen from FIG. 2(B) that no alloy layer exists on the joint surface E and the joint surface can not easily be distinguished. This means that homogenization was sufficiently accomplished.

Next, as an example of the conventional brazing method, BNi-2 (JIS Z3625) was employed. The insert material A was a powder composition formed by adding 3% B to the components similar to IN-738LC, the base metal. The insert material B was a foil composition formed by removing Al and Ti from the components similar to the IN-738LC base metal but adding 3% B. Two each tensile testpieces were heat-treated at 1,170° C. for one hour in the non-oxidizing atmosphere, and the results of high temperature tensile test at 640° C. were compared with those of the heat-treatment in the present invention under the same test condition (FIG. 3).

It can be appreciated from FIG. 3 that in accordance with the method of the present invention, the joint portion has high tensile disruptive strength and strength substantially compatible to that of the base metal.

Although the foregoing embodiments has been described with reference to the diffusion bonding method of the Ni-based alloy, it has been confirmed that when applied to heat-resistant alloys based on Co, Fe and Ti, the method of the invention provides the joint portion having substantially the same characteristics as those of the base metal. The diffusion bonding method of the present invention can be applied not only to bonding of the base metals of the same kind but also to bonding of the base metals of different kinds.

As described in the foregoing, in accordance with the present invention, the alloy layer is formed in advance on the base metal at the time of diffusion bonding and the interface between the joint surfaces is one so that the joint strength compatible to that of the base metal can be obtained within a short diffusion treatment time.

What is claimed is:

1. A diffusion bonding method comprising: forming, in advance, a low melting alloy layer on at least one of the joint surfaces of base metals, said base metals each comprising a superalloy based on an element selected from the group consisting of Ni, Co, Fe and Ti, said forming of said low melting alloy layer being accomplished by melting which is carried out by a high energy beam used for melting said at least one of the joint surfaces and by incorporating at least one additional element from a material comprising a boron powder and an organic binder, said at least one additional element having a higher diffusion speed than that of the principal constituent element of said base metals, and said low melting alloy layer having a lower melting point than that of said base metals; then bringing the joint surfaces into contact; and heating the joint surfaces of a temperature in the range of the melting point of said alloy layer to that of said base metals in a non-oxidizing atmospheric furnace so as to diffuse said at least on additional element away from said joint surfaces and to bond said metals to each other.

2. The diffusion bonding method as defined in claim 1 wherein said base metal is a separation hardening type Ni superalloy containing Al and Ti.

3. The diffusion bonding method as defined in claim 1 wherein said alloy layer contains B.

4. The diffusion bonding method as defined in claim 1, wherein said at least one additional element is selected from the group consisting of B and Hf and is deposited as a coating material on said at least one of the joint surfaces prior to the formation of said alloy layer.

5. The diffusion bonding method as defined in claim 4, wherein said coating material is comprised of a B powder, an acrylic resin and methyl ethyl ketone in a mixing ratio of 1:1:1.

6. The diffusion bonding method as defined in claim 1, wherein said melting is carried out by laser radiation.

7. The diffusion bonding method as defined in claim 1, wherein said melting is carried out by plasma radiation.

* * * * *